United States Patent [19]  [11] 3,840,202
Lemoigne  [45] Oct. 8, 1974

[54] PARACHUTE CANOPY
[75] Inventor: Pierre Marcel Lemoigne, Montrouge, France
[73] Assignee: Etudes Et Fabrications Aeronautigues, Clichy, France
[22] Filed: June 30, 1972
[21] Appl. No.: 268,211

[30] Foreign Application Priority Data
July 22, 1971  France .............................. 71.26878

[52] U.S. Cl. .............................................. 244/145
[51] Int. Cl. ............................................ B64d 17/02
[58] Field of Search ............ 244/145, 152, 146, 142

[56] References Cited
UNITED STATES PATENTS
3,099,426  7/1963  Lemoigne ............................ 244/145
3,508,726  4/1970  Lemoigne ............................ 244/152
FOREIGN PATENTS OR APPLICATIONS
2,055,752  4/1971  France ................................. 244/145
1,137,840  10/1955  France ................................. 244/145
253,241  3/1963  Australia .............................. 244/145

Primary Examiner—Trygve M. Blix
Assistant Examiner—Charles E. Frankfort

[57] ABSTRACT

Parachute canopy comprising in each of two diametrally opposed lateral sectors, an arcuate peripheral row of balloon nozzles very close to the leading edge of the canopy each of which has an escape opening for escape of air tangentially of the extrados and is elongated in a direction parallel to the leading edge, all the nozzles being oriented in the same direction and an adjacent arcuate row of pocket nozzles each of which is upwardly convergent to an apex and has an anti-shock apex opening and an escape opening for escape of air in a direction tangentially of the extrados. The nozzles and pocket nozzles pertaining to the two sectors are symmetrically disposed relative to a diametral plane through the centre of the canopy. All the escape openings are perpendicular to the leading edge and face in the same direction.

1 Claim, 9 Drawing Figures

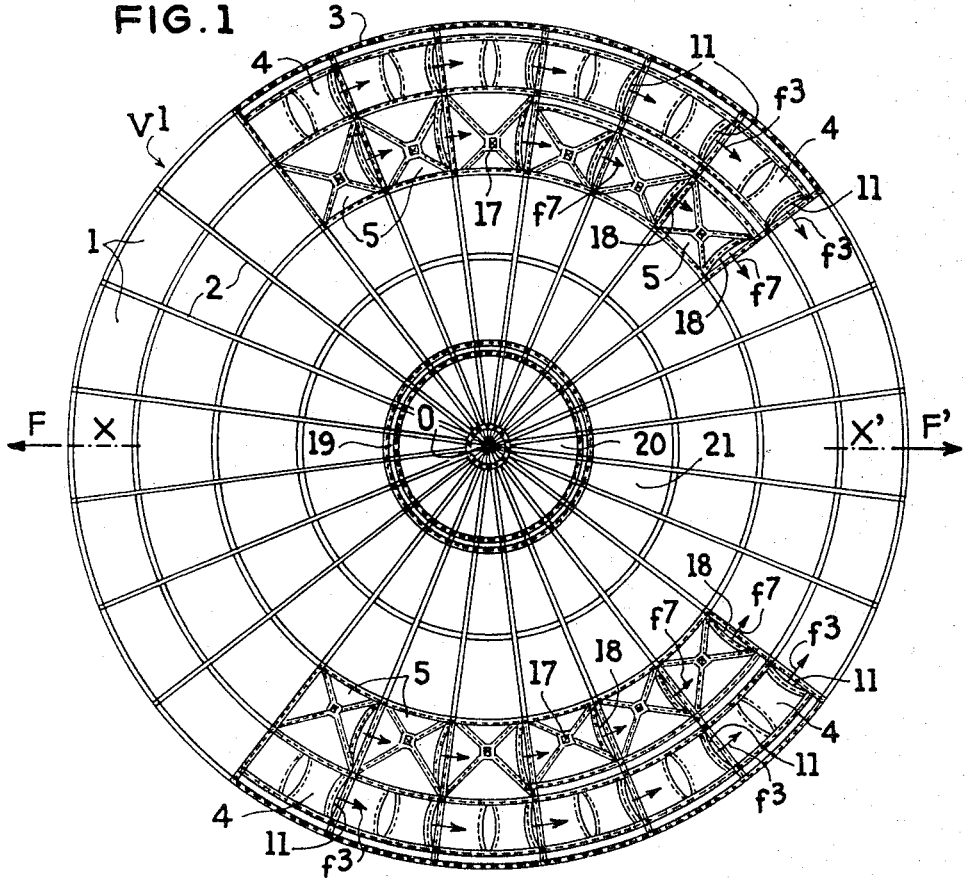
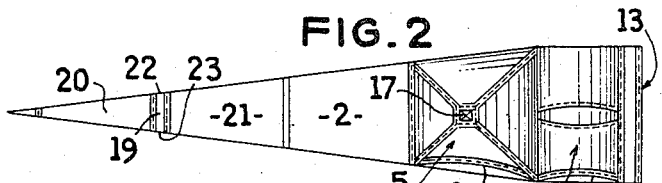
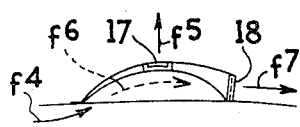
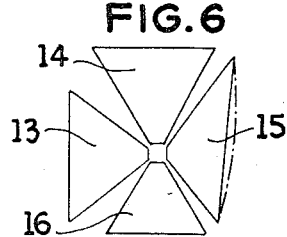
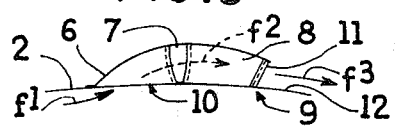
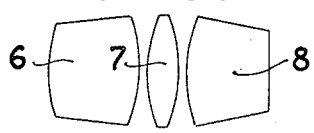

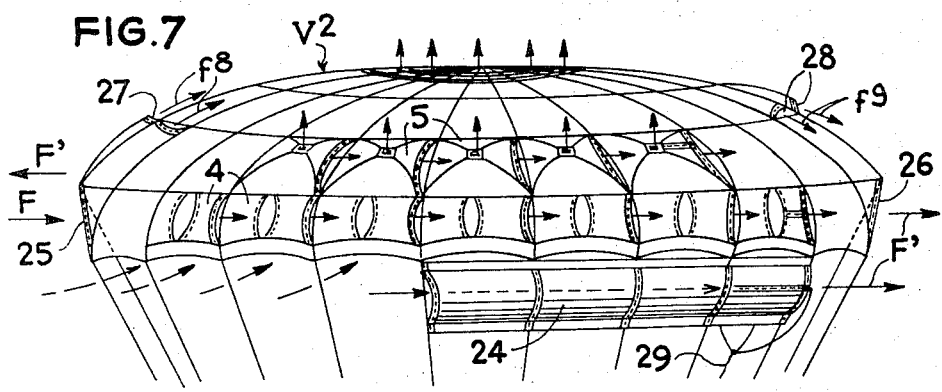
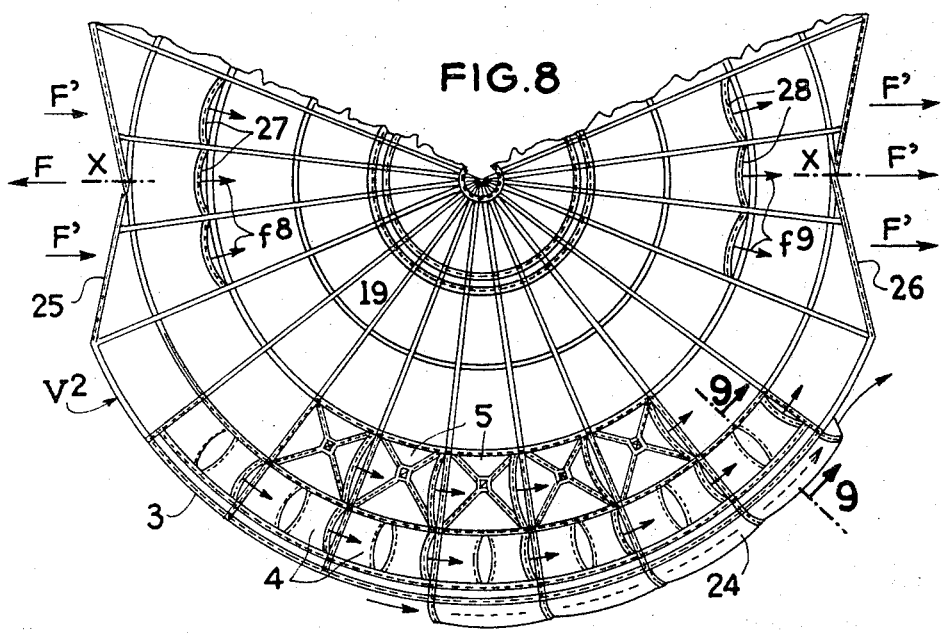
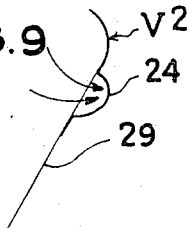

PARACHUTE CANOPY

The present invention relates to parachutes and more particularly to parachute canopies.

In French Pat. No. 1,523,172, the Applicant has disclosed hyperlift devices for canopies and in particular parachute canopies. These devices essentially comprise nozzles termed "balloon" nozzles each of which has the shape of a convex elongated pocket which is placed on the canopy and which, in the case of a parachute canopy, opens at one end onto the intrados of the canopy by way of a large air inlet and at the other end onto the extrados by way of an outlet opening through which the air flows tangentially to the extrados surface.

Further, in the French Pat. application No. 69 27,330 of Aug. 8, 1969, the Applicant has also described hyperlift pockets for parachute canopies, these pockets having a generally conical or pyramidal shape with the concavity facing, and opening onto, the intrados of the canopy, each of these pockets moreover opening onto the extrados by way of an opening located roughly at the level of its large base for the purpose of allowing the air to escape tangentially to the extrados surface and by way of an anti-shock orifice located at the apex.

An object of the present invention is to provide an improved canopy for a parachute comprising the application of said two types of hyperlift means in the form of a combination which imparts to the canopy highly improved capacity as to transverse spread and hyperlift and imparts to the parachute very high steering capacity.

The invention provides a canopy comprising in each of two diametrally opposed lateral sectors an arcuate peripheral row of balloon nozzles in close proximity to the leading edge, said nozzles having an outlet opening on the extrados of the canopy and being elongated in the direction parallel to said edge and all oriented in the same direction, and an adjacent arcuate row of pyramidal or conical pocket nozzles having an anti-shock apex opening and an outlet opening for escape of air tangential to the extrados, the rows of nozzles and pocket nozzles pertaining to the two sectors being symmetrically disposed relative to a diametral plane containing the centre of the canopy and all the tangential outlet openings being oriented in such manner as to be perpendicular to the leading edge and facing roughly in the same direction.

Owing to the two peripheral rows of nozzles of the "balloon" type:

the lift and self-propulsion qualities of the canopy are particularly enhanced, since the utilisation of the qualities of hyperlift and self-propulsion of the balloon nozzles is maximum owing to their positions at the very periphery of the canopy;

moreover, these nozzles ensure a very rapid and complete transverse spread or deployment of the canopy, which can only be obtained with known canopies with central suspension lines which have the serious drawback of complicating, in particular in respect of airborne troop parachutes, the folding of the canopies provided with these parachutes;

these results are obtained with no likelihood of any effect if canopy instability due to an excessively rapid lifting and spreading action on the part of the balloon nozzles, since their action is absorbed or damped by the adjacent pyramidal or conical pockets having an anti-shock apex opening, said pockets, which also constitute nozzles, moreover damping, braking and stabilizing the action of the balloon nozzles.

According to one embodiment, the canopy comprises in the known manner an assembly of triangular gores which converge at the centre of the canopy and each gore located in one of the lateral sectors comprises, starting from its peripheral base and in the direction from this base toward the apex, first a balloon nozzle, then a pyramidal or conical pocket nozzle, said balloon nozzle and said pocket nozzle extending through the width of the gore and their tangential outlet openings being located on the same radial edge of the gore.

Further features and advantages of the invention will be apparent from the ensuing description with reference to the accompanying drawings.

In the drawings:

FIG. 1 is a plan view from above of the extrados of a canopy of the type more particularly employed on parachutes for airborne troops improved in accordance with the invention;

FIG. 2 is a plan view of one of the gores of the canopy provided with a balloon nozzle and a pyramidal pocket;

FIG. 3 is a side elevational view, on an enlarged scale, of a balloon nozzle;

FIG. 4 is a sectional view of three portions of fabric laid out flat before assembly and intended for the nozzle shown in FIG. 3;

FIG. 5 is a side elevational view, on an enlarged scale, of one of the pyramidal pockets constituting nozzles;

FIG. 6 is a plan view, before assembly, of four portions of fabric intended to produce, when stitched together, said pyramidal nozzle pocket;

FIG. 7 is a side elevational view of another embodiment of a canopy according to the invention;

FIG. 8 is a corresponding plan view of the canopy shown in FIG. 7, and

FIG. 9 is a partial sectional view taken on line 9—9 of FIG. 8.

In the embodiment shown in FIGS. 1–6, the canopy $V^1$, more particularly intended for parachutes of airborne troops, comprises in the conventional manner the assembly of a number of radial gores 1 which are interconnected along their edges 2 by stitching reinforced by bands.

According to the invention, on each side of a fore and aft diametral plane X–X' and symmetrically relative to said plane, the canopy comprises two rows of nozzles in two diametrally opposed sectors. On each side of this plane there is provided a first peripheral row (which is in the immediate vicinity of the lateral leading or peripheral edge 3) of balloon nozzles 4 and a second adjacent row of pyramidal nozzle-pockets 5. In the illustrated embodiment, there is provided, for each row, six balloon nozzles of elongated shape laid along the leading edge one after the other and, adjacent this row, the same number of pocket nozzles 5. Each of the nozzles 4 and pocket nozzles 5 extends (FIG. 2) throughout the width of a gore 1 from one edge 2 to the opposite edge.

The balloon nozzles 4 are of the type described in the aforementioned U.S. Pat. No. 1,533,172 and one of these nozzles is shown in longitudinal section in FIG. 3. FIG. 4 shows three portions of fabric 6, 7, 8 which form, when stitched together, this balloon nozzle. When it is in the active position, it is inflated as shown in FIG. 3 and it is sewn to the fabric of the corresponding gore 2 in such manner that its inner cavity opens onto the intrados 9 of the canopy, that is, under the canopy, by way of an inlet opening 10 formed in the gore, whereas the air which flows into this pocket can escape therefrom by way of an outlet opening 11 formed at the end of the nozzle so that the air which has entered the nozzle in the direction of arrow $f^1$ by way of the opening 10 and has flowed in a direction of the arrow $f^2$ through the nozzle issues from the latter in the direction of arrow $f^3$ tangentially to the upper surface or extrados 12 of the canopy.

In each gore the two openings 11 and 18 (FIG. 2) are located on the same edge 2 of the gore in such manner that all the outlet openings 11, which are thus each perpendicular to the leading or peripheral edge 3 face the same direction, as can be seen in FIG. 1 where the arrows $f^3$ indicate, as in FIG. 3, the tangential outlet or escape of the air on the extrados of the canopy.

As concerns the pyramidal pocket nozzles 5, one of them is shown in section in FIG. 5 whereas FIG. 6 shows four portions of fabric 13, 14, 15 and 16 which constitute this pocket nozzle when stitched together. This pocket nozzle comprises an upper outlet orifice 17 by way of which a part of the air which enters the pocket in the direction of arrow $f^4$ escapes upwardly in the direction of arrow $f^5$, whereas the remainder of the air which has travelled through the pocket in the direction of arrow $f^6$ issues tangentially on the extrados at $f^7$ by way of an outlet opening 18 formed at the base of the pyramidal pocket nozzle 5 as shown in FIG. 5 and also in FIG. 1, the tangential outlet in the direction of arrow $f^7$ for each pocket nozzle 5 being parallel to the tangential outlet in the direction of arrow $f^3$ of the adjacent balloon nozzle.

The canopy $V^1$ shown in FIG. 1 is completed by a ring of anti-shock outlet openings 19 in the vicinity of the centre 0 of the parachute. This ring arrangement of openings is formed by the juxtaposition in end-to-end relation of slots 19 formed in the various gores 2 where the adjacent centre portion 20 and peripheral portion 21 of the fabric are merely interconnected on their edges at 22 and 23 by the radial bands which reinforce the gore.

This canopy and the parachute provided with the canopy, operates in the following manner:

As soon as the parachutist jumps, the canopy inflates and spreads laterally very rapidly owing to the entry of air in the cavities opening onto the intrados and formed by the two rows of balloon nozzles 4 and, to a lesser extent, by the two rows of pyramidal pocket nozzles 5.

Under the action of the balloon nozzles 4, the transverse spreading of the canopy is very rapid but the shock which might result therefrom is absorbed by the pyramidal pocket nozzles 5 owing to the absorbing effect afforded by the escape by way of the upper orifices 17 in the direction of arrows $f^5$ (FIG. 5) of a part of the air which enters the pocket nozzles 5.

The pocket nozzles 5 moreover participate in the hyperlift effect due for the major part to the balloon nozzles 4 whose action is predominant from all points of view owing to their nature and their position on the periphery of the canopy very near the leading edge 3 in the two diametrally opposed lateral portions of this leading edge.

Further, owing to the tangential escape of air in the direction of arrows $f^3$ and $f^7$ by way of the respective orifices 11 and 18 of the balloon nozzles 4 and of the pyramidal pocket nozzles 5, the escape streams or jets giving, each one, a reaction effect, all the effects produced, or at least their components parallel to the diametral plane X–X', are added together so as to give a propelling resultant in the direction of arrow F (FIG. 1).

Consequently, not only the canopy is perfectly spread or deployed, owing to the considerable hyperlift qualities due to the lateral nozzles 4 and 5 but, moreover, this canopy is also self-propelling, the parachute and the parachutist being transported in the direction of arrow F whereas the relative wind sweeps across the intrados of the parachute in the direction parallel to the plane X–X', and symmetrically relative to the latter, in moving relative to the canopy in the direction opposed to arrow F, that is in the direction of arrow F'.

The ring arrangement of central openings 19 performs, owing to the escape of the air that it allows at the centre of the parachute, the function of an anti-shock ring. It permits avoiding excessive shocks which might result from the rapid opening and spreading due to the action of the nozzles 4, 5.

With reference now to the embodiment shown in FIGS. 7–9, the parachute canopy $V^2$ is improved, on one hand in accordance with the first embodiment by the presence, symmetrically arranged, with respect to the fore and aft diametral plane X–X, of two peripheral rows of balloon nozzles 4 and adjacent pyramidal nozzles 5 and, on the other hand, by the ring of central anti-shock openings 19.

This canopy $V^2$ further comprises:

semi-tubular lateral stabilizers 24 on each side of the diametral plane X–X which ensure a particularly effective self orientation and a constant stability in direction; one of the stabilizers 24 is shown in cross section in FIG. 9 with one of the rigging lines 29;

a front notch 25 and a rear notch 26 adapted to facilitate the displacement of the canopy in the direction of arrow F by facilitating the flow of the relative wind in the reverse direction indicated by arrows F';

and, in a region of the notches and in the known manner, front nozzles 27 and rear nozzles 28 which permit a tangential escape of air in the direction of arrows $f^8$ and $f^9$ on the extrados of the canopy so as to increase the fineness of control owing to their hyperlift and propelling qualities, which fineness of control is already considerably improved by the notches 25 and 26 which ensure a perfect distribution of the supply and flow of the air over the whole surface of the intrados.

The view in elevation in FIG. 7 explains, owing to the various arrows, the hyperlift and propelling flow of the streams of air which sweep across the canopy and are due to all of the described elements which produce, as explained hereinbefore, the maximum lateral spread or deployment of the canopy of the parachute, its hyperlift and its self-propulsion.

It will be observed that the handling or steering of this canopy can be still more considerably improved owing to additional controls indicated at 29 in FIG. 7 of the type of those normally employed on competition parachutes for ensuring the partial or total closure of certain flows or escapes of accelerating air.

Briefly, owing to the various improvements according to the invention, the canopy shown in FIGS. 7 and 8 can advantageously constitute the canopy of a parachute which is either of the ascending or competition type or remote controlled for, for example, recovering objects or loads which it is desired to deposit in a predetermined area of the ground.

Having now described my invention what I claim as new and desire to secure by Letters Patent is:

1. A parachute comprising in combination a canopy having a center and a peripheral edge, rigging lines attached to the canopy and extending from said peripheral edge, lateral substantially semi-tubular stabilizing means which are located in two regions of the peripheral edge on opposite sides of a fore and aft vertical plane through the center of the canopy and are open toward said vertical plane and depend from said peripheral edge so that diameters of said semi-tubular stabilizing means are substantially parallel to the rigging lines of the parachute in vertical planes of the parachute through said center when the parachute is open, said regions terminating short of said fore and aft vertical plane so as to define with said peripheral edge a front recess and a rear recess which recesses are intersected by said fore and aft vertical plane and thereby maintain a privileged and stable direction of movement of the parachute in a direction parallel to said fore and aft plane, and, in each of two sectors of the canopy, an arcuate peripheral row of balloon nozzles substantially adjoining the peripheral edge, each of said nozzles having an escape opening for escape of air tangentially of the extrados of the canopy and being elongated in a direction parallel to the peripheral edge and all the nozzles being oriented in the same direction, and an adjacent arcuate row of pocket nozzles each of which pocket nozzles is upwardly convergent to an apex and has an anti-shock opening at the apex, and an escape opening for escape of air in a direction tangentially of the extrados of the canopy, the rows of balloon nozzles and pocket nozzles pertaining to the two sectors being symmetrically disposed with respect to said fore and aft vertical plane through the center of the canopy, and all the escape openings being oriented in such manner as to be perpendicular to the peripheral edge and facing substantially in the same direction.

* * * * *